United States Patent
Yasuta et al.

(10) Patent No.: US 8,888,632 B2
(45) Date of Patent: Nov. 18, 2014

(54) DOUBLE-SIDED DRIVING SILENT CHAIN AND DOUBLE-SIDED DRIVING SILENT CHAIN TRANSMISSION USING THE SAME

(75) Inventors: Mitsuru Yasuta, Kaga (JP); Yukihiro Kishi, Kaga (JP); Nobuyuki Matsui, Kaga (JP)

(73) Assignee: Daido Kogyo Co., Ltd., Ishikawa (JP)

( * ) Notice: Subject to any disclaimer, the term of this patent is extended or adjusted under 35 U.S.C. 154(b) by 901 days.

(21) Appl. No.: 12/715,502

(22) Filed: Mar. 2, 2010

(65) Prior Publication Data

US 2010/0222170 A1    Sep. 2, 2010

(30) Foreign Application Priority Data

Mar. 2, 2009  (JP) .................. 2009-048466

(51) Int. Cl.
| | |
|---|---|
| *F16G 13/02* | (2006.01) |
| *F16G 5/20* | (2006.01) |
| *F16G 13/04* | (2006.01) |
| *F16H 57/00* | (2012.01) |
| *F16G 13/18* | (2006.01) |
| *F16G 13/08* | (2006.01) |
| *F16H 7/06* | (2006.01) |

(52) U.S. Cl.
CPC .............. *F16H 7/06* (2013.01); *F16H 57/0006* (2013.01); *F16G 13/18* (2013.01); *F16G 13/04* (2013.01); *F16G 13/08* (2013.01)
USPC ............................. 474/213; 474/206; 474/212

(58) Field of Classification Search
CPC ......... F16G 13/02; F16G 13/04; F16G 13/08; F16H 7/06
USPC .......................................... 474/206, 212, 213
See application file for complete search history.

(56) References Cited

U.S. PATENT DOCUMENTS

| | | | | |
|---|---|---|---|---|
| 1,140,319 | A * | 5/1915 | Houten .................... | 474/139 |
| 5,345,753 | A * | 9/1994 | Okuda et al. .............. | 59/5 |
| 5,967,926 | A * | 10/1999 | Kozakura et al. ........... | 474/213 |
| 5,989,140 | A * | 11/1999 | Ichikawa et al. ............ | 474/148 |
| 6,155,944 | A * | 12/2000 | Matsuda ................... | 474/157 |
| 6,168,543 | B1 * | 1/2001 | Matsuda ................... | 474/157 |
| 6,171,209 | B1 * | 1/2001 | Matsuda ................... | 474/213 |
| 7,059,985 | B2 * | 6/2006 | Markley et al. ............. | 474/213 |
| 7,476,170 | B2 * | 1/2009 | Ogo et al. .................. | 474/212 |
| 7,641,578 | B2 * | 1/2010 | Matsui et al. ............... | 474/212 |

(Continued)

FOREIGN PATENT DOCUMENTS

| | | |
|---|---|---|
| JP | 11-236950 | 8/1999 |
| JP | 2006-242329 | 9/2006 |

*Primary Examiner* — Henry Liu
(74) *Attorney, Agent, or Firm* — Jordan and Hamburg LLP

(57) ABSTRACT

A silent chain using double-sided driving link plates having symmetrical upper and lower teeth has a problem that it is unable to assure a required risky sectional area of the plates because a width between upper and lower crotches is narrow. The invention provides a silent chain using double-sided driving link plates whose required risky sectional area is maintained by using link plate whose back side is undercut and whose upper and lower parts are unsymmetrical even though its front side has a shape of a normal link plate. A distance from a line connecting centers of pin holes to a bottom of an upper-side crotch is equal to or more than ½ of a diameter of the pin hole to assure the risky sectional area. Teeth of the back side are cut away to form a flat surface to assure a contact area with a shoe and others.

7 Claims, 10 Drawing Sheets

(56) References Cited

U.S. PATENT DOCUMENTS

| | | | |
|---|---|---|---|
| 7,771,304 B2* | 8/2010 | Ogo et al. | 474/213 |
| 2002/0013191 A1* | 1/2002 | Saito et al. | 474/213 |
| 2002/0025870 A1* | 2/2002 | Kozakura et al. | 474/214 |
| 2002/0142874 A1* | 10/2002 | Markley et al. | 474/202 |
| 2002/0155911 A1* | 10/2002 | Hummel et al. | 474/212 |
| 2003/0017896 A1* | 1/2003 | Markley et al. | 474/157 |
| 2005/0277507 A1* | 12/2005 | Ogo et al. | 474/206 |
| 2006/0199691 A1* | 9/2006 | Matsui et al. | 474/212 |
| 2007/0111835 A1* | 5/2007 | Ogo et al. | 474/213 |
| 2007/0213156 A1* | 9/2007 | Zbikowski et al. | 474/213 |

* cited by examiner

FIG.2A1
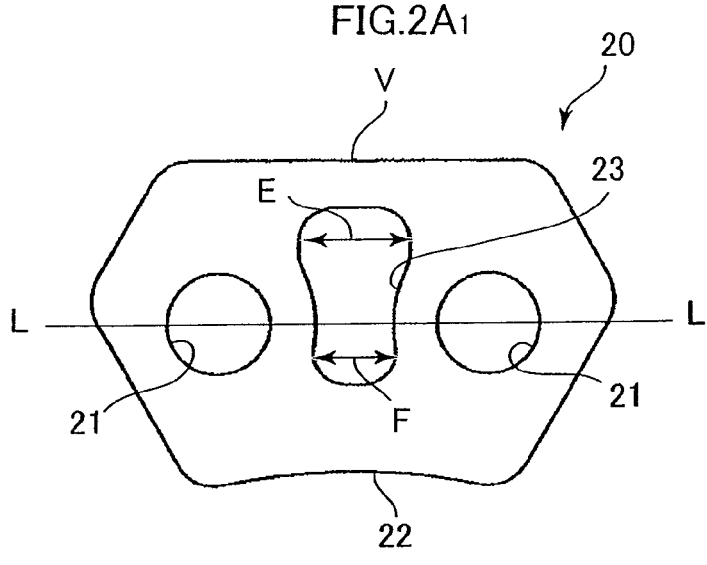
FIG.2A2
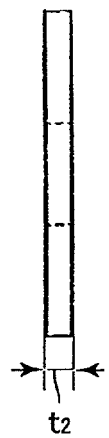
FIG.2B1
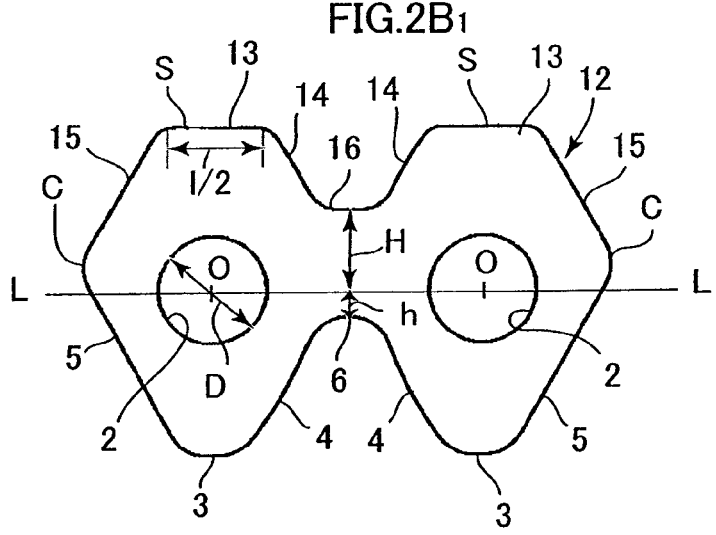
FIG.2B2
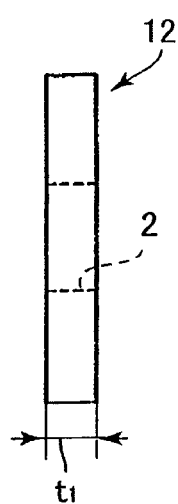
FIG.2C1
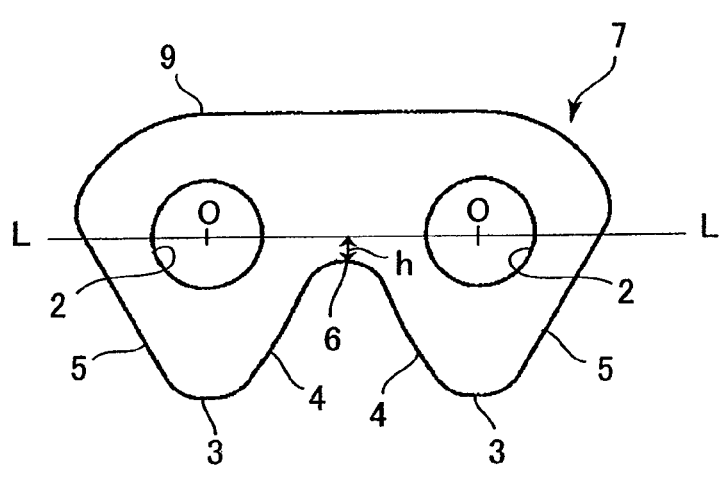
FIG.2C2
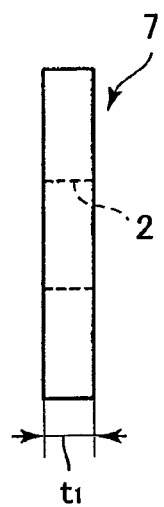

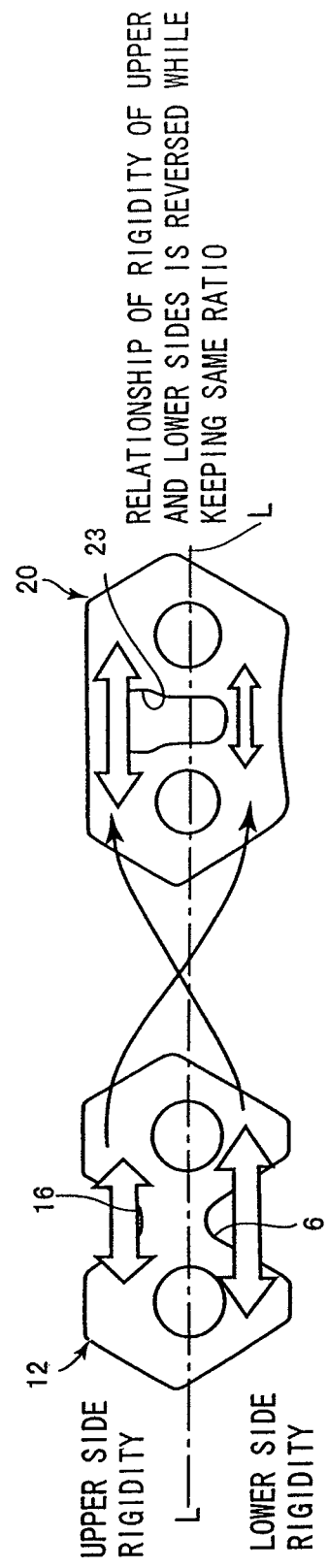

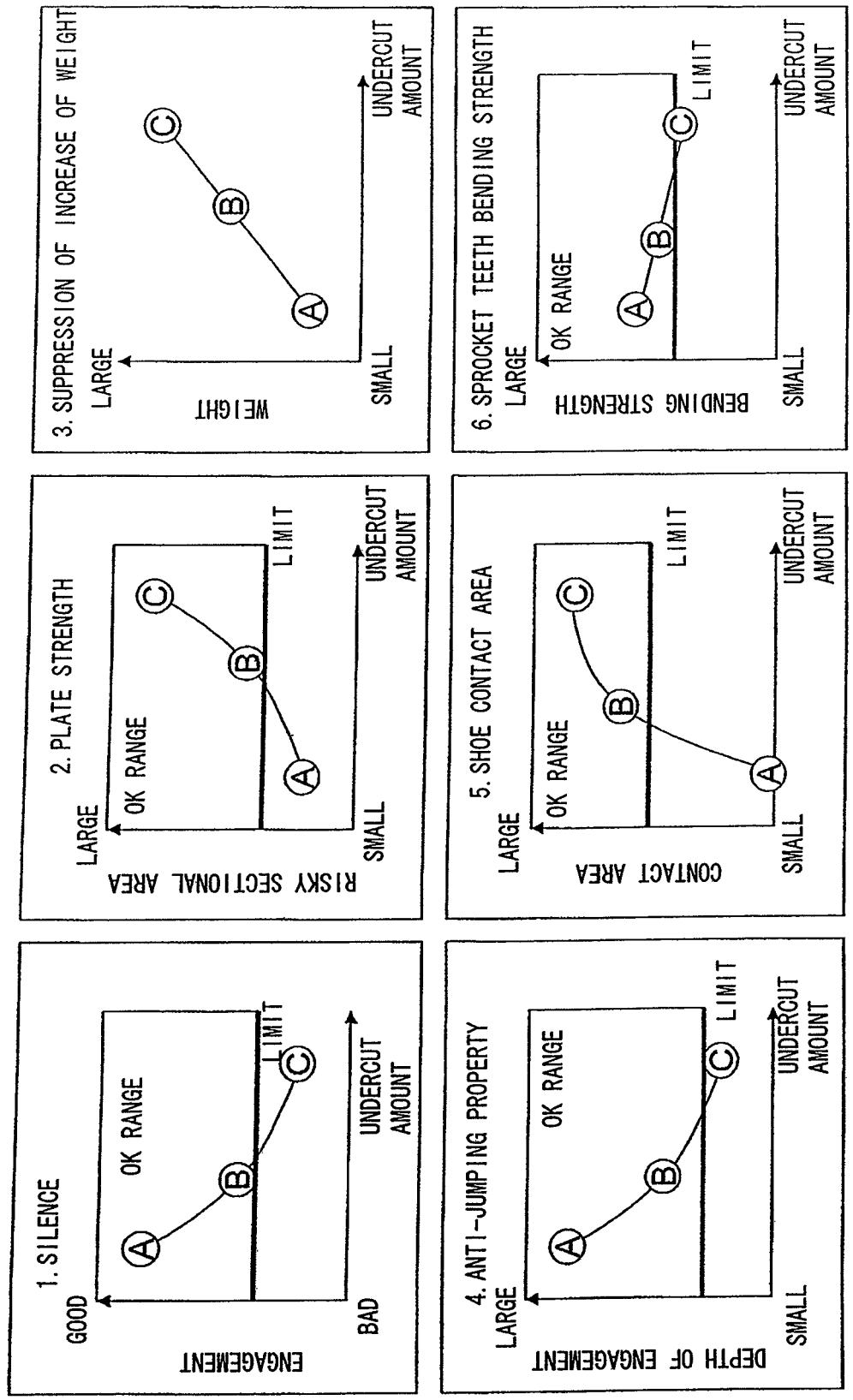

DOUBLE-SIDED DRIVING SILENT CHAIN AND DOUBLE-SIDED DRIVING SILENT CHAIN TRANSMISSION USING THE SAME

CROSS REFERENCE TO RELATED APPLICATION

This application claims the foreign priority benefit under Title 35, United States Code, §119(a)-(d) of Japanese Patent Application No. 2009-048466, filed on Mar. 2, 2009 in the Japan Patent Office, the disclosure of which is herein incorporated by reference in its entirety.

BACKGROUND OF THE INVENTION

1. Field of the Invention

The present invention relates to a double-sided driving silent chain that engages with sprockets with inner and outer sides of the endless silent chain and more specifically to a double-sided driving silent chain using double-sided driving link plates each having teeth on both upper and lower sides thereof and to a silent chain transmission using the same.

2. Description of Related Art

Lately, a silent chain is being put into practical use as a timing chain for transmitting rotation of an engine crankshaft to a cam shaft as well as to a shaft of auxiliary units such as an oil pump and to that end, there is being proposed a double-sided driving silent chain that engages with sprockets with both inner and outer sides of the chain.

While there are the following types of double-sided driving silent chains, i.e., one that is provided with both inner side driving link trains in which link plates are arranged so that their teeth face to the inner side and outer side driving link trains in which link plates are arranged so that their teeth face to the outer side as disclosed in Japanese Patent Laid-open No. 2006-242329 for example and another one that uses double-sided driving link plates having teeth on both upper and lower sides of each link plate (facing respectively to the both outer and inner sides of the chain) as disclosed in Japanese Patent Laid-open No. Hei. 11-236950 for example, the present invention relates to the silent chain using the double-sided driving link plates.

As shown in FIG. 10, the conventional double-sided driving link plate 1 has a shape in which teeth sides of single-sided link plates are coupled symmetrically about a line L-L connecting centers of pin holes 2. The link plate 1 has, at its lower part, a pair of teeth 3, inner flanks 4 formed in a part (crotch) between the both teeth and outer flanks 5 formed on outer faces of the respective teeth and at its upper part, a pair of teeth 3', inner flanks 4' formed in a part (crotch) between the both teeth and outer flanks 5 formed on outer faces of the respective teeth in the same manner with the lower part. The double-sided driving silent chain is formed by endlessly linking the double-sided driving link plates 1 alternately by pins inserted into the pin holes 2 while placing guide link plates fixed with the pins at outermost sides of the double-sided driving link plates (see Japanese Patent Laid-open No. Hei. 11-236950).

While a width B of the double-sided driving link plate 1 at part between bottoms of the upper and lower crotches 6 and 6' is narrow and a plate cross-sectional area (width B×plate thickness t) of the width part is a risky sectional area that has important implications in terms of strength of the plate, it is difficult to assure enough plate strength with respect to the link plate 1 having the symmetrical shape as described above.

Still more, while the silent chain using the double-sided driving link plates 1 contacts with a guide arm or a shoe of a lever by its outer circumferential face, an area of contact of the link plate with the shoe or the like has important implications in terms of advancement of wear of the link plate, shoe and others and affects a life of the silent chain. However, the symmetrical link plate 1 described above has the teeth 3 and 3' having the same edge portions in the lower and upper parts thereof (i.e., on both inner and outer circumferential faces of the silent chain) and the contact area of the edge portion of the curved teeth 3' is very small, so that the wear of the shoe, guide and others advances quickly and it is difficult to assure an enough life as a silent chain transmission.

Accordingly, the present invention seeks to provide a double-sided driving silent chain, and a double-sided driving silent chain transmission using the same, capable of solving the aforementioned problems by using a double-sided driving link plate formed so that its upper and lower parts are asymmetrical.

SUMMARY OF THE INVENTION

According to the invention (see FIGS. 1 and 2 for example), there is provided a double-sided driving silent chain assembled endlessly by linking double-sided driving link plates, each having a pair of teeth on both sides thereof, by means of pins, wherein the double-sided driving link plate is formed such that a crotch between the pair of teeth of another side, e.g., a backside, is shallower than that of a crotch between the pair of teeth of one side, e.g., a front side, and a distance from a center line connecting a pair of pin holes to a bottom of the crotch of the other side is equal to or greater than a half of a diameter of the pin hole and the double-sided driving link plate is formed such that the upper and lower parts thereof are asymmetrical about the center line.

Accordingly, tensile strength and fatigue strength of the double-sided driving link plate may be kept by assuring the width between the bottoms of the both crotches of the link plate, so that it is possible to provide a transmission capacity and a life required for the double-sided driving silent chain and the silent chain transmission using the same.

Preferably, the double-sided driving silent chain has relationships of:

$$H \geq 1.5h,\ 1.5D \geq H \geq 0.5D\ \text{and}\ 0.7D \geq h \geq 0;$$

where h is a distance from the centerline to the bottom of the crotch of one side, H is the distance from the center line to the bottom of the crotch of the other side and D is the diameter of the pin hole.

Accordingly, it becomes possible to assure the engagement performance of the double-sided driving silent chain and first or second sprocket engaging and driving one side or the other side of the chain, to assure silence and an anti-jumping property of the chain and to keep tooth bending strength of the sprocket while suppressing an increase of weight.

Preferably, edges of the pair of teeth of one side are substantially curved and edges of the pair of teeth of the other side are formed to be flat surfaces that are parallel to the center line. It is noted that the curved face described above includes one in which a very small flat surface is formed at the edge of the tooth and means that it seems to be substantially curved to a tip of the tooth as a whole.

The edges of the teeth of the other side of the dl are thus flattened, so that it is possible to assure the area of contact with the slidably contact means such as the chain guide and the shoe of the tensioner, to reduce the wear of the silent chain, the chain guide and the shoe of the tensioner and to keep the life required for the silent chain and the silent chain transmission.

Preferably, intersections of outer flanks formed on an outer side of the pair of teeth of one side of the double-sided driving link plate with outer flanks formed on an outer side of the pair of teeth of the other side are disposed on the side of the other side from an extension of the center line.

Preferably, guide link plates are disposed on outermost sides of the number of double-sided driving link plates ranked in a longitudinal direction of the pin while being fixed to the pin and the guide link plate has a trimming hole having a large area on the side of the other side than that of one side about the center line.

Accordingly, even though an outer link train (rank) having the guide link plates has an extra number of plates as compared to an inner link train (rank) having no guide link plate and a strength balance is lost, it is possible to suppress an increase of weight and to lessen the unbalance of the strength by proving the trimming hole in the guide link plate. Still more, because the area of the trimming hole on the other side of the guide link plate is made larger than that of one side, it is possible to cancel a difference of rigidities of upper and lower part of the double-sided driving link plate about the center line and to improve a rigidity balance of the whole silent chain.

For example as shown in FIG. 3, a ratio of tensile rigidities of one side and the other side of the double-sided driving silent chain about the center line is inversely proportional to a ratio of tensile rigidities of one side and the other side of the guide link plate about the center line.

Accordingly, even though the rigidities of the upper and lower parts of the double-sided driving link plate in the tensile direction are different about the pin hole center line because the depth of the crotches of one side and the other side are different, the guide link plate has the rigidities proportionally inverse to those of the double-sided driving silent chain, so that the balance of the rigidities of the upper and lower parts of the whole double-sided driving silent chain may be kept.

Preferably, the double-sided driving link plates are linked endlessly so that one side thereof faces to the endless inner circumferential side and the other side thereof faces to the endless outer circumferential side.

Accordingly, one side of the link plates having the depth of crotch equal to that of the normal silent chain faces to the endless inner circumferential side, thus capable of driving equally to the normal silent chain, and the other side of the link plate having the shallow crotch faces to the endless circumferential side, thus capable of transmitting and driving the outer circumferential side silent chain having a less load as compared to that of the inner circumferential side of the silent chain.

For example as shown in FIGS. 4 and 5, there is provided a double-sided driving silent chain transmission that includes a first sprocket that engages with one side of the double-sided driving silent chain and a second sprocket that engages with the other side of the double-sided driving silent chain, wherein the first and second sprockets engage respectively with one side or the other side with the same engagement mechanism and a height of teeth of the second sprocket is shorter than that of the first sprocket. It is noted that the same engagement mechanism means such an engagement mechanism in which the sprocket tooth seats on the outer flank of the link plate of the silent chain after contacting with the inner flank of the link plate, i.e., so called the mechanism of contact-with-inner-flank and seat-on-outer flank.

Accordingly, the normal engagement mechanism of one side of the double-sided driving silent chain with the teeth of the first sprocket has the same engagement mechanism (e.g., the engagement of inner-flank and outer-flank) in which the teeth of the second sprocket engage with the other side of the double-sided driving silent chain though the tooth height is short, so that it is possible to transmit power smoothly and silently.

Preferably, the teeth of the first and second sprockets are cut by a hob cutter having the same shape while undercutting the teeth of the second sprocket.

Accordingly, it is possible to readily manufacture the first and second sprocket teeth by cutting by the hob cutter having the same shape and by undercutting the engagement portion of the teeth of the second sprocket.

Preferably, the double-sided driving silent chain transmission further includes a slidable contact section that guides the double-sided driving silent chain by slidably contacting with the other side of the chain.

A timing chain transmission is constructed by arranging such that the first sprockets are a driving sprocket linked with a crankshaft of an engine and two driven sprockets linked with camshafts of the engine and the second sprocket is a driven sprocket linked with auxiliary units of the engine.

It is noted the one side of the silent chain and the first sprockets that engage similarly to the normal silent chain transmission handle the main driving from the engine crank shaft to the cam shafts and drive a valve operating system steadily with accurate timing. The second sprocket having the short tooth height and the other side of the silent chain handle the auxiliary units such as the oil pump whose torque load is small as compared to the valve operating system and can transmit power related to the timing chain without trouble.

It is noted that the summary of the invention described above does not necessarily describe all necessary features of the invention. The invention may also be a sub-combination of the features described above.

BRIEF DESCRIPTION OF DRAWINGS

FIGS. 1A and 1B show a double-sided driving silent chain of the invention, wherein FIG. 1A is a partially sectional plan view and FIG. 13 is a front view thereof;

Figure 4A:
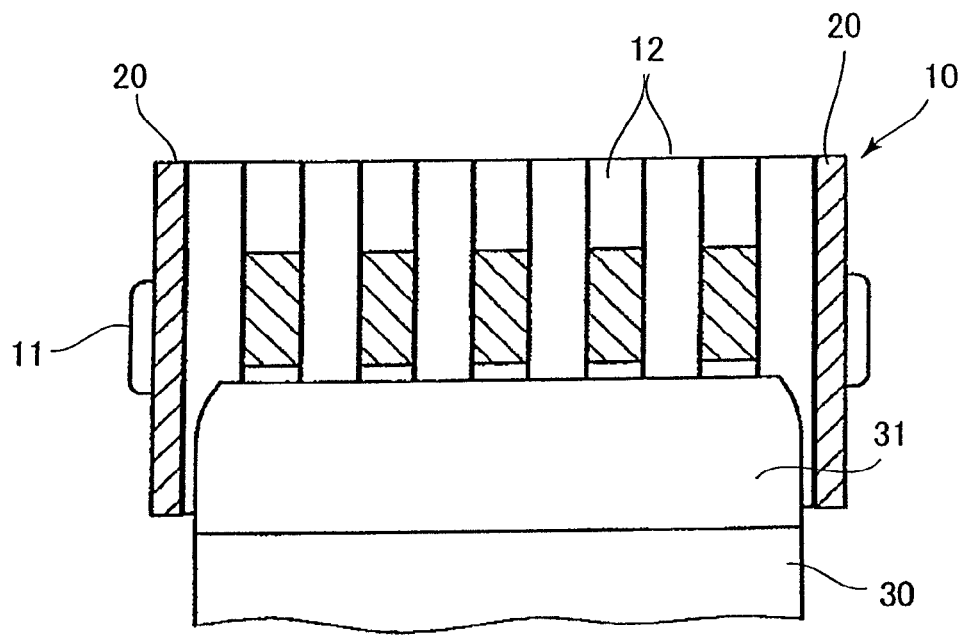
Figure 4B:
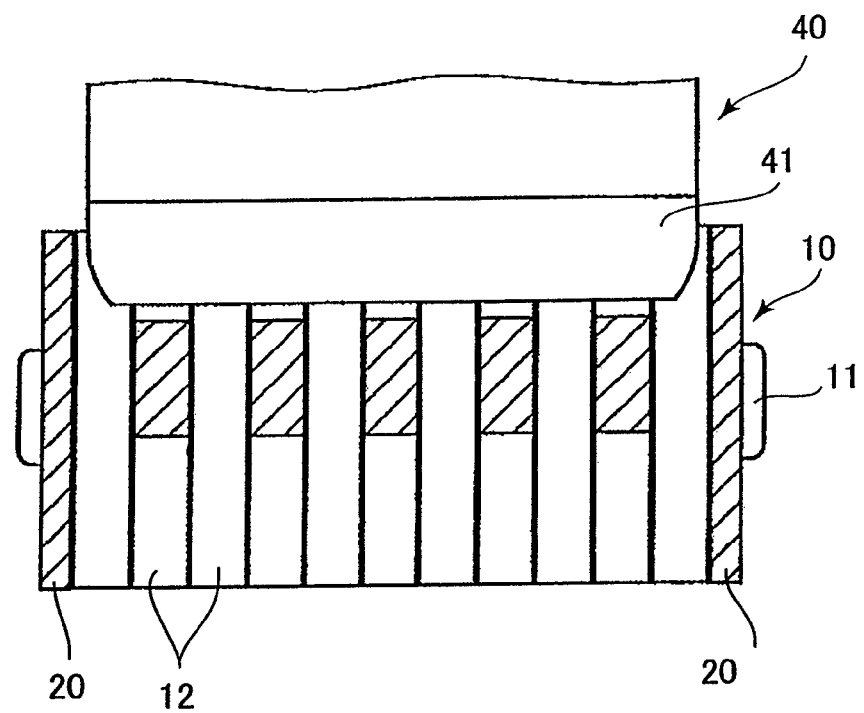
Figure 5:
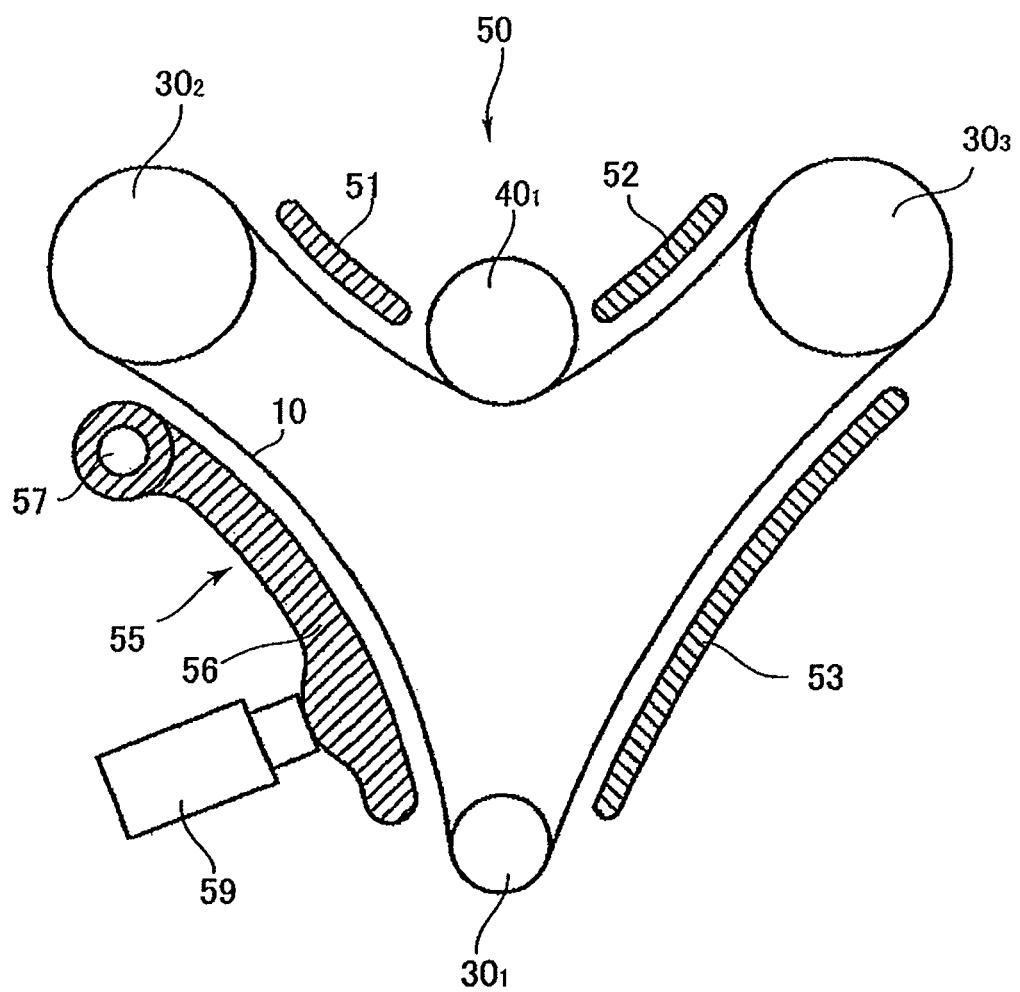
Figure 6:
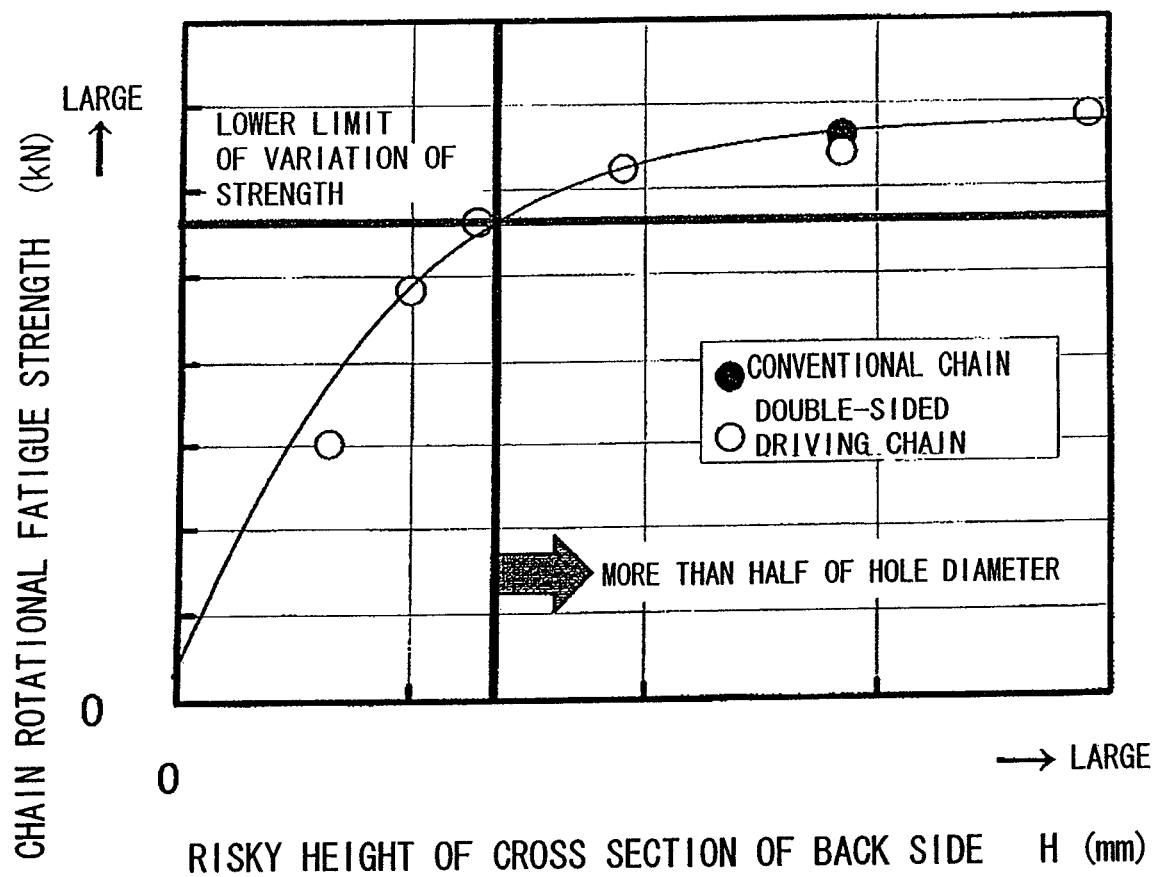
Figure 7:
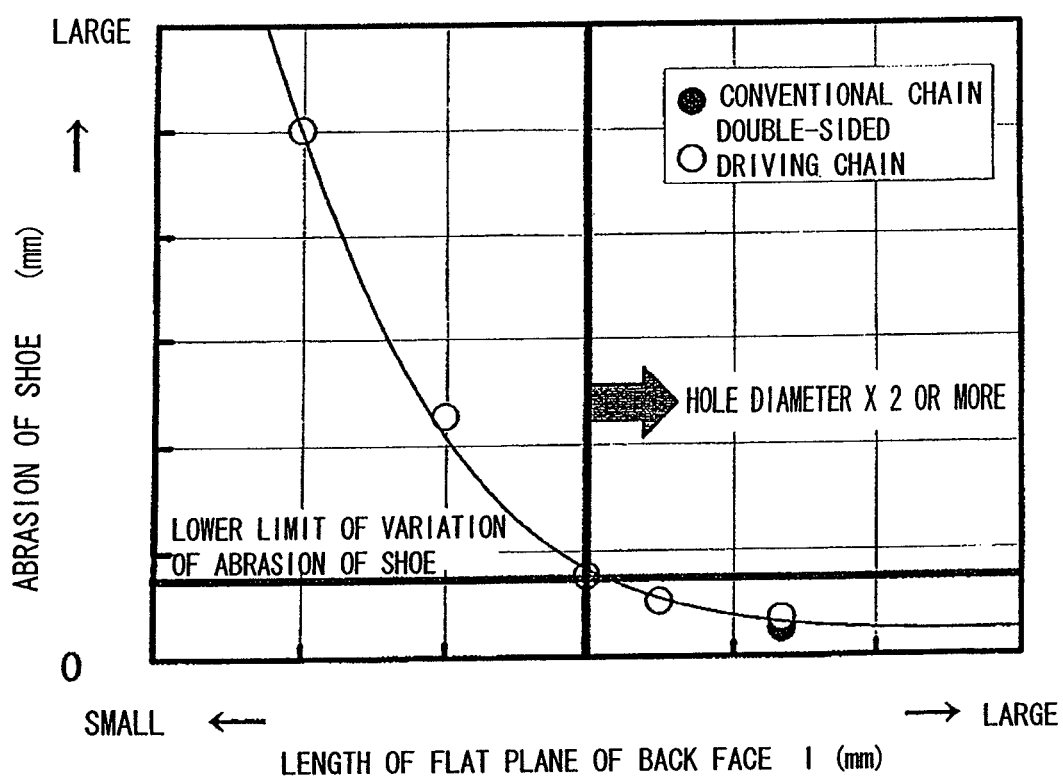
Figure 8A:
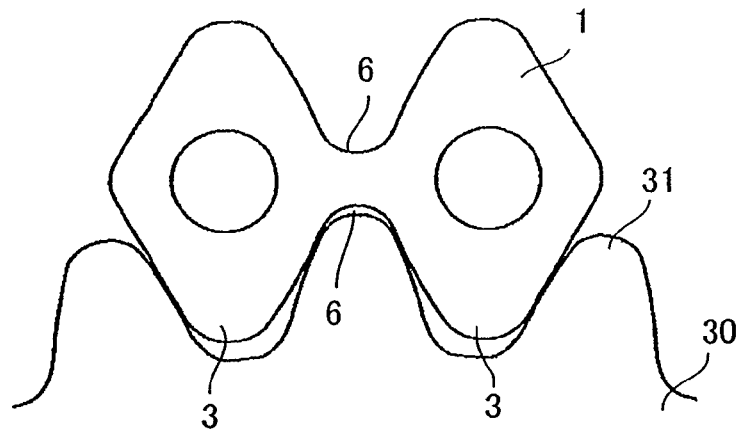
Figure 8B:
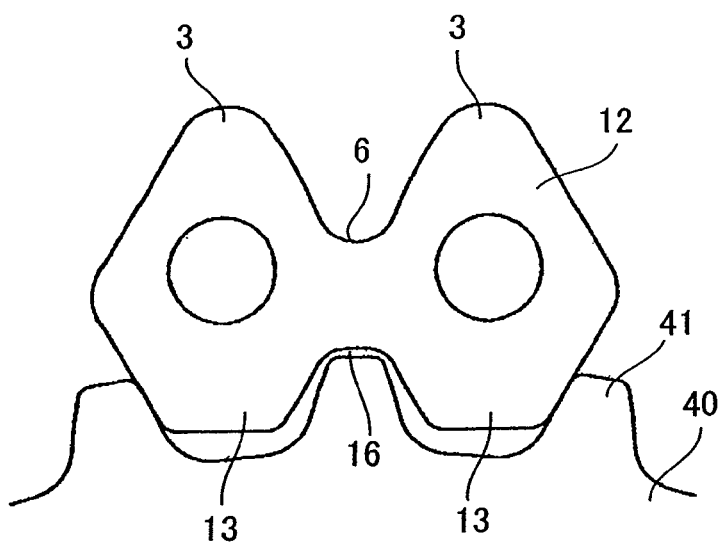
Figure 8C:
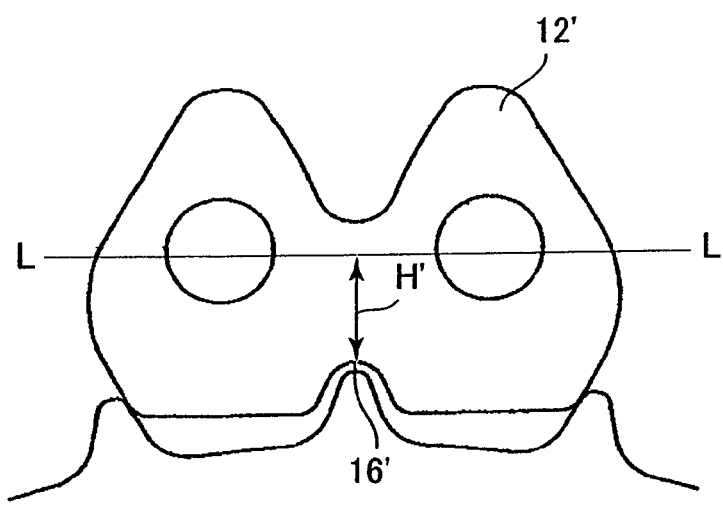
Figure 10:
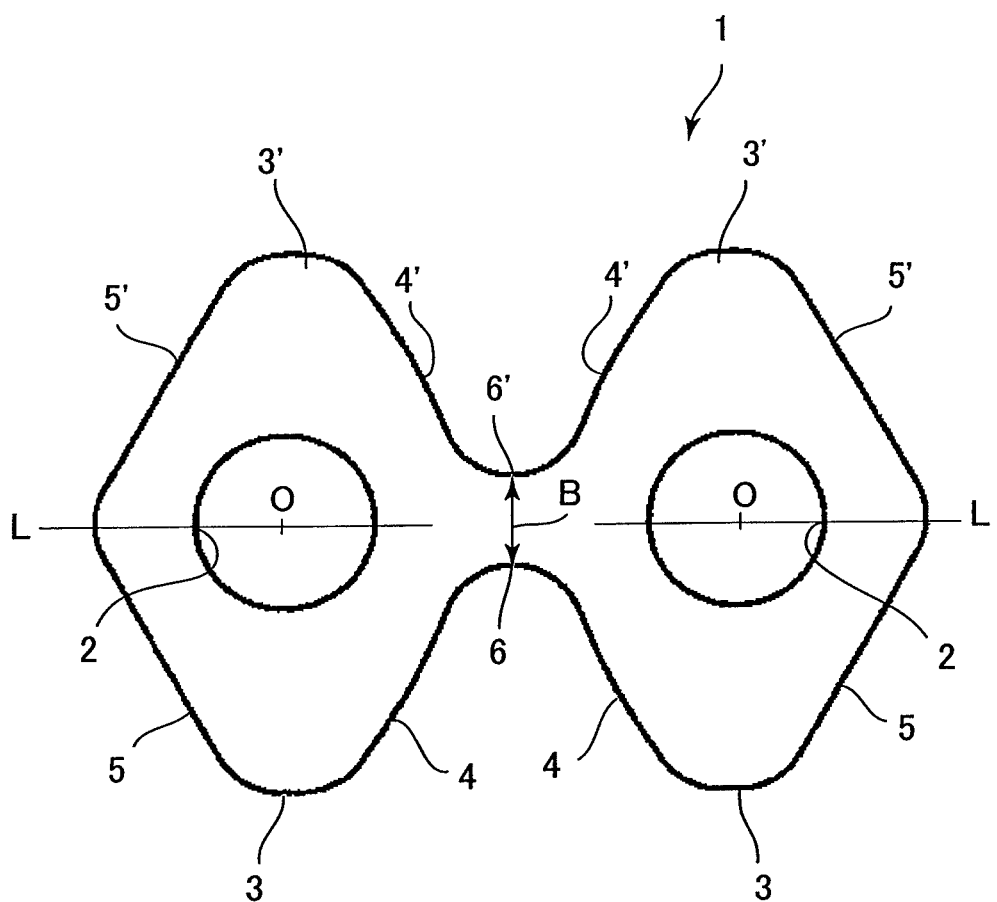

FIGS. $2A_1$, $2A_2$, $2B_1$, $2B_2$, $2C_1$ and $2C_2$ show plates of the silent chain, wherein FIG. $2A_1$ is a front view of a guide link plate of the invention and FIG. $2A_2$ is a side view thereof, FIG. $2B_1$ is a front view of a double-sided driving link plate of the invention and FIG. $2B_2$ is a side view thereof and FIG. $2C_1$ is a front view of a conventional single-sided driving link plate and FIG. $2C_2$ is a side view thereof;

FIGS. 3A and 3B are front views indicating rigidity of upper and lower sides of the double-sided driving link plate and the guide link plate, wherein FIG. 3A shows the double-sided driving link plate and FIG. 3B shows the guide link plate;

FIGS. 4A and 4B show engagements of the double-sided driving silent chain with sprocket teeth, wherein FIG. 4A shows the engagement on the front (one side or inner circumferential) side and FIG. 43 shows the engagement on the back (another side or outer circumferential) side of the chain;

FIG. 5 is a front view showing an embodiment of a double-sided driving silent chain transmission using the double-sided driving silent chain as an engine timing chain;

FIG. 6 is a graph showing a relationship between a risky sectional height of the backside of the double-sided driving link plate and rotational fatigue strength of the chain;

FIG. 7 is a graph showing a relationship between a length of the backside of the link plate sliding with a shoe and the like of a lever and a wear of the shoe;

FIGS. 8A, 8B and 8C show various double-sided driving link plates and sprocket teeth engaging with them, wherein FIG. 8A shows a conventional double-sided driving link plate having symmetrical upper and lower parts, FIG. 8B shows the double-sided driving link plate of the invention and FIG. 8C shows a double-sided driving link plate whose teeth size is reduced further;

FIGS. 9-1 through 9-6 show comparison results of performances of the various double-sided driving silent chain transmissions shown in FIG. 8; and FIG. 10 is a front view of the conventional double-sided driving link plate formed so that upper and lower parts are symmetrical.

BEST MODE FOR CARRYING OUT THE INVENTION

Figure 1A:
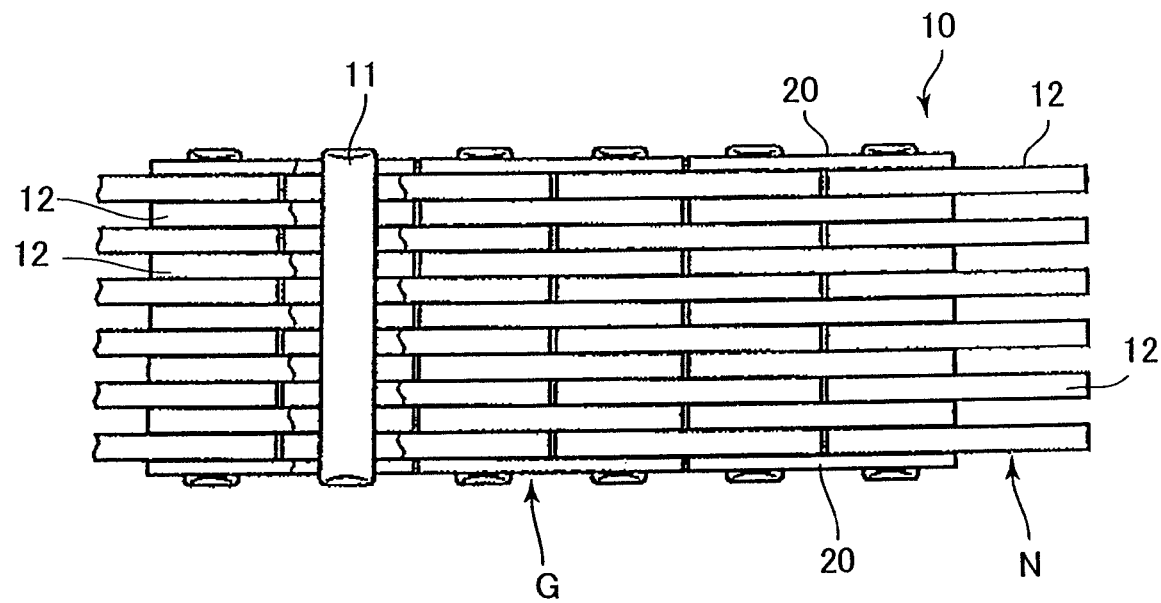
Figure 1B:
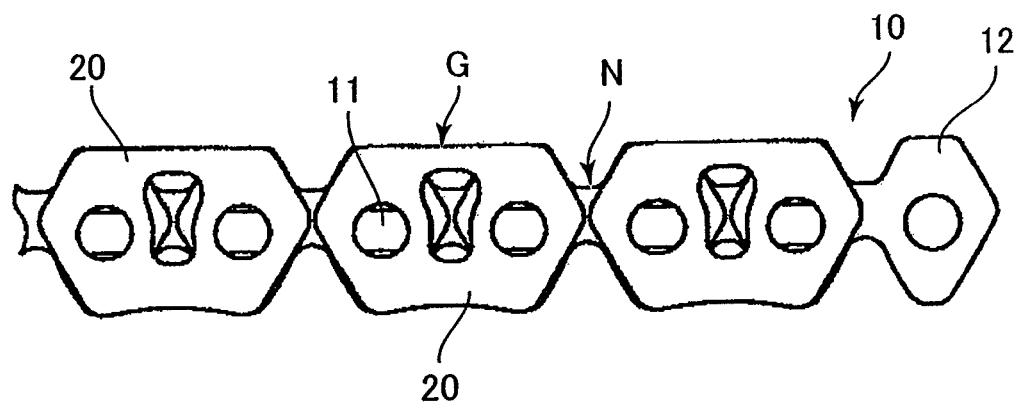

An embodiment of the invention will be explained below with reference to the drawings. As shown in FIGS. 1A and 1B, a double-sided driving silent chain 10 of the invention is composed of a plurality of double-sided driving link plates 12 alternately linked by pins 11 endlessly in a longitudinal direction while placing guide link plates 20 at outermost sides of a link rank (horizontal train) of those link plates 12. The pins 11 are fixed to the right and left guide link plates 20 by means of caulking or the like. Accordingly, the link plates 12 of an outer link rank (guide link rank) G having the guide link plates do not rotate relatively with respect to the pin 11 and the link plates 12 of an inner link rank (non-guide link rank) N neighboring the outer link rank rotates relatively with respect to the pin 11, so that the double-sided driving silent chain 10 can bend freely.

As shown in FIG. $2B_1$, the double-sided driving link plate 12 has a pair of pin holes 2 laterally positioned and a lower part thereof under a line L-L connecting centers O of the pin holes 2 (referred to as a pin hole center line hereinafter) has the same shape with a normal single-sided driving link plate 7 shown in FIG. $2C_1$. Denoting parts of the plates shown in FIGS. $2B_1$ and $2C_1$ by the same reference numerals, they have a pair of teeth 3 respectively protruding in a lower direction (downward) orthogonally to the pin hole center line L-L from the pin hole parts, inner flanks 4 formed at a crotch 6 portion between those teeth and outer flanks 5 formed on outer sides of the respective teeth 3. While the single-sided driving link plate 7 shown in FIG. 2C1 has a flat face 9 on an upper side (backside) thereof, the double-sided driving link plate 12 shown in FIG. 2B1 is formed to be a variant back (other side) driving link plate.

While the double-sided driving link plate 12 has a pair of teeth 13 on the back (other side), i.e., the upper side of the pin hole centerline L-L, similarly to the lower side, a height of the teeth is made lower than that of the teeth 3 of the front (lower) side made of the ordinary teeth. Accordingly, an upper-side crotch 16 between those teeth is also formed to be shallower than that of the front (lower) side. Inner flanks 14 are formed on inner side faces of the teeth 13, i.e., on the upper-side crotch 16, and outer flanks are formed on outer side faces of the teeth 13. Accordingly, a distance H from a bottom of the upper side (backside) crotch 16 to the pin hole center line L-L is larger than a distance h (that is equal to that of the normal single-sided driving link plate 7) from a bottom of the lower side (front side) crotch 6 to the pin hole center line L-L (i.e., h<H).

The upper side (backside, other side) distance H is set to be more than a half of a pin hole diameter D and to be less than 1.5 times thereof. The lower side (front side, one side) distance h is set to be more than zero and to be less than 0.7 times of the pin hole diameter D. The upper side distance H is set to be more than 1.5 times of the lower side distance h. Accordingly, they have the following range-wise relationship:

H≥1.5h, 1.5D≥H≥0.5D and 0.7D≥h≥0

Or, more preferably, 3.5 h>H>2.5h, D≥H≥0.5D and 0.5D>h≥0

Then, edges of the upper-side teeth 13 (tips of the teeth) are cut away to form flat faces S. A length of the flat face S of each tooth tip ½ is equal to or more than the pin hole diameter D. Accordingly, a length l of the flat faces S of the backside of one link plate 12 is more than two times of the pin hole diameter, i.e., l≥2D.

Intersecting points C of the upper and lower outer flanks 15 and 5 are positioned above (back side) the pin hole center line L-L by a predetermined distance and the front (one side) and back side (other side) teeth have a shape of silent teeth of the same engagement mechanism (inner flank-outer flank engagement).

As shown in FIG. $2A_1$, the guide link plate 20 has a pair of pin holes 21 in the same manner with other plates, a toothless curved shape 22 formed on its lower side (inner circumferential side of the chain) and a straight flat face V formed on its upper side (backside). The flat face V of the guide link plate 20 is located on the same side (upper side, other side or backside) with the flat face S of the double-sided driving link plate 12 and slidably contacts simultaneously with a chain guide and a shoe and others of a chain tensioner. The guide link plate 20 has a relatively large trimming hole 23 formed at part between the pin holes 21. The trimming hole 23 is formed asymmetrically about the pin hole center line L-L such that an upper width E is larger than a lower width F. Accordingly, an area of an upper part of the trimming hole 23 formed above the pin hole center line L-L is larger than that of a lower part.

As shown in FIGS. $B_2$, $C_2$ and $A_2$, a thickness $t_1$ of the double-sided driving link plate 12 is substantially equal to a thickness $t_1$ of the guide link plate 20 and a thickness $t_2$ of the guide link plate 20 is thinned to be about a half of the thickness of the double-sided driving link plate 12. The guide link plate 20 whose rigidity is dropped by thinning the thickness $t_2$ and by forming the trimming hole 23 balances stress caused by tensile load acting in a chain pitch direction on the outer link rank G having one extra link plate and the inner link rank N and prevents the chain from being elongated and the pins from being ruptured due to the stress that otherwise bends the link pins 11.

As shown in FIG. 3A, a depth of the upper-side crotch 16 of the double-sided driving link plate 12 is smaller than that of the lower-side crotch 6 and accordingly, tensile rigidity of the upper part of the double-sided driving link plate 12 is stronger than that of the lower part. That is, the upper part of the double-sided driving link plate 12 is less elongated as compared to the lower part by tensile force in the chain pitch direction. Meanwhile, tensile rigidity of an upper part of the guide link plate 20 is smaller than that of the lower part and the upper part is more elongated as compared to the lower part by the tensile force due to the trimming hole 23 formed to be vertically asymmetrical about the pin hole centerline L-L. The link plate and the guide link plate described above have such a relationship that proportion of the rigidities of their upper and lower parts is substantially equal when they are upside down. This arrangement averages the tensile rigidities of the whole silent chain 10 by canceling the rigidities of the link plate 12 and the guide link plate 20 by the upper and lower parts thereof as described above.

The double-sided driving silent chain 10 engages with a sprocket with its front side (one side or inner side) and with another sprocket with its back (other side or outer side). FIG.

4A shows the engagement by the front side of the chain 10. The sprocket 30 has a normal sprocket tooth 31 that engages with the normal tooth 3 (the inner flank 4 or the outer flank 5) positioned on the front side (one face) of the double-sided driving link plate 12. FIG. 4B shows the engagement on the back. The sprocket 40 has a sprocket tooth 41 whose height is lower than that of the normal sprocket tooth 31. The sprocket tooth 41 engages with the short tooth 13 (the inner flank 14 or the outer flank 15) positioned on the back (other side) of the double-sided driving link plate 12. The sprocket 30 that engages with the front side is cut normally by using a hob cutter. The sprocket 40 that engages with the back is manufactured by undercutting only an engaging section by using the same hob cutter (or a hob cutter having the same shape).

FIG. 5 shows an embodiment of a double-sided driving silent chain transmission 50 using the double-sided driving silent chain 10 as an engine timing chain. The double-sided driving silent chain 10 is assembled endlessly while setting the front (one face) side thereof as the inner circumferential side. The double-sided driving silent chain 10 is wound around a sprocket $30_1$ connected to a crank shaft and driven sprockets $30_2$ and $30_3$ connected to two cam shafts and disposed in the inner circumferential side. A driven sprocket $40_1$ that drives auxiliary units such as an oil pump, a water pump and others is engaged with the back (outer circumferential) side of the silent chain 10 between the both driven (cam shafts) sprockets $30_2$ and $30_3$. The sprockets $30_1$, $30_2$ and $30_3$ disposed on the inner circumferential side of the chain engage with the front side of the chain as shown in FIG. 4A and the sprocket $40_1$ disposed on the outer circumferential side of the chain engages with the back of the chain as shown in FIG. 4E.

Chain guides 51 and 52 that keep a predetermined winding angle of the chain around the driven sprocket $40_1$ for the auxiliary unit that engages with the back of the chain are disposed before and after the sprocket $40_1$ in a chain running direction while slidably contacting with the back (outer circumferential) side of the chain. Still more, a chain guide 53 and a chain tensioner device 55 are disposed respectively on two chain outer circumferential faces of the silent chain transmission 50 that is formed into a triangular shape as a whole. The chain guide 53 is formed of a relatively long bar-like member and guides the chain by slidably contacting with the flat faces S and V of the back (outer circumferential side) of the silent chain 10. The chain tensioner device 55 has a lever 56 having a shoe on a curved side and rockably supported by a pin 57 and a tensioner 59 that urges the lever 56 to the chain by hydraulic or spring force of the tensioner 59. The shoe of the lever 56 gives a predetermined tension to the chain by slidably contacting with the flat faces S and V of the back (outer circumferential face) of the chain.

A driving force of the driving sprocket $30_1$ connected to the engine crank shaft is transmitted to the two driven sprockets $30_2$ and $30_3$ by the double-sided driving silent chain 10 to synchronously rotate the cam shafts. The driving force is also transmitted to the sprocket $40_1$ that engages with the back of the chain to drive the auxiliary units such as the oil pump, water pump and others. While loads of torque of the driving sprocket $30_1$ and the driven sprockets $30_2$ and $30_3$ that are wound around the chain, i.e., disposed on the inner circumferential side the chain, and transmit power are relatively large because they drive a valve operating system from the crank shaft to the cam shafts, they can transmit the power reliably and accurately by the front engagement similar to the normal one-sided driving engagement. Meanwhile, although the heights of the chain and the sprocket tooth of the driven sprocket $40_1$ that engages with the back of the chain are low, the sprocket $40_1$ can transmit the power without trouble because a load of torque is relatively small and a variation of torque is also small since the sprocket $40_1$ drives the auxiliary units.

The double-sided driving link plate 12 is formed so that the crotch of the other (back) side is shallow and a width B (H+h) between the both crotches is widened, so that the double-sided driving link plate 12 can keep a fully large tensile strength by enlarging the risky sectional area. The double-sided driving link plate 12 can also transmit power silently and smoothly in the same manner with the normal silent chain transmission when it engages on the front side and can also transmit power silently and smoothly in the same manner when it engages on the back by an engagement mechanism (the sprocket tooth 41, the inner flank 14 and the outer flank 15) that is similar to the frontal engagement.

Still more, while the chain guides 51, 52 and 53 and the shoe of the lever 56 of the chain tensioner device 55 slidably contact with the chain 10, the double-sided driving silent chain 10 has the flat surfaces S and V having the same height and fully large area on the back of the double-sided driving link plate 12 and of the guide link plate 20 and the guides, shoe and others described above slidably contact with those flat surfaces with the large contact area, so that it is possible to prevent those slidably contact parts from wearing quickly.

Next, operations and effects of the double-sided driving silent chain and the transmission of the invention will be explained with reference to FIGS. 6 through 9.

FIG. 6 is a graph showing a relationship between the back-side distance (risky sectional height) H of the double-sided driving link plate 12 and chain rotational fatigue strength. If the backside distance H is equal to or larger than the pin hole diameter (D) (H≥0.5D), the fatigue strength exceeds variation lower limit strength and the chain is sustainable for use. It is noted that the conventional chain means the single-sided driving link plate 7 shown FIG. $2C_1$ in which the height H represents the distance from the pin hole center line L-L to the back face 9.

FIG. 7 is a graph showing a relationship between the length of the backside of the link plate and a wear (abrasion) of the shoe. The length l of the backside length is the length l of the flat surfaces S of the backside teeth 13 in the case of the double-sided driving link plate 12 and is a length of the flat portion of the back face 9 in the case of the conventional chain. If the length l of the flat surfaces S is equal to or more than twice of the pin hole diameter D (l≥2D), it is less than an upper limit of variation of the wear of the shoe and the chain is fully sustainable for use.

FIG. 8A shows a chain transmission using the conventional double-sided driving link plate having symmetrical upper and lower parts (see FIG. 10) and this chain will be called as a chain A. FIG. 8B shows a chain using the double-sided driving link plate of the invention and this chain will be called as a chain B. FIG. 8C shows a chain transmission using a double-sided driving link plate 12' whose backside crotch 16' is made shallow even more and this chain will be called as a chain C.

FIGS. 9-1 through 9-6 are graphs comparing performances of the three types of chains A, B and C described above. (1) In terms of silence, although the chain A that engages in the form of the normal silent chain is naturally excellent and the chain C whose teeth height is short resides below the limit, the chain B resides above the limit of engagement and is sustainable for use (in an OK range). (2) In terms of plate strength, the chain A whose risky sectional area is small resides below the limit and is unsustainable for use. While the chain C whose height H' is large has an enough risky sectional area, the chain B also resides above the limit and is sustainable for use. (3) Suppression of an increase of weight is proportional to the depth of the crotches 6, 16 and 16' and is in the order of the chain A, B and C.

(4) An anti-jumping property relates to a depth of engagement and while the chain A is excellent and the chain C exceeds the limit because its engagement is insufficient, the chain B resides within the limit and is sustainable for use. (5) In terms of the shoe contact area, while the chain A having the curved tooth edge resides below the limit and the chain C has a large contact area, the chain B has a contact area larger than the limit and is sustainable for use. (6) In terms of bending strength of the sprocket teeth, while the chain C resides below the limit because its tooth is small, the chains A and B have bending strength above the limit.

Although the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A double-sided driving silent chain, comprising
an endless assembly of double-sided driving link plates and pins, each link plate having a pair of teeth on both sides thereof and the pins alternately linking the link plates,
the double-sided driving link plate being formed such that a crotch between the pair of teeth of another side is shallower than a crotch between the pair of teeth of one side and a distance from a center line connecting a pair of pin holes to a bottom of the crotch of the other side being equal to or greater than a half of a diameter of the pin hole,
the double-sided driving link plate being formed such that upper and lower parts thereof are asymmetrical about the center line, edges of the pair of teeth of the one side being substantially curved and edges of the pair of teeth of the other side being formed completely as flat surfaces that are parallel to the center line,
the pair of teeth of the one side and the pair of teeth of the other side each comprise inner flanks and outer flanks each forming respectively same sprocket engagement mechanisms, and a height of the pair of teeth of the other side is shorter than a height of the pair of teeth of the one side when measured from a base of the crotch of the respective other and one sides,
intersections of outer flanks formed on an outer side of the pair of teeth of the one side of the double-sided driving link plate with outer flanks formed on an outer side of the pair of teeth of the other side are disposed on the side of the other side and spaced from an extension of the center line, and
the double-sided driving silent chain has relationships of:

$H \geq 1.5h, 1.5D \geq H \geq 0.5D$ and $0.7D \geq h \geq 0$, where h is a distance from the center line to a bottom of the crotch of the one side, H is the distance from the center line to the bottom of the crotch of the other side and D is the diameter of the pin hole.

2. The double-sided driving silent chain according to claim 1, wherein guide link plates are disposed on outermost sides of the number of double-sided driving link plates ranked in a longitudinal direction of the pin while being fixed to the pin and
the guide link plate has a trimming hole having a large area on another side than that of one side about the center line.

3. The double-sided driving silent chain according to claim 2, wherein a ratio of tensile rigidities of the one side and the other side of the double-sided driving link plate about the center line is inversely proportional to a ratio of tensile rigidities of the one side and the other side of the guide link plate about the center line.

4. The double-sided driving silent chain according to claim 1, wherein the double-sided driving link plates are linked endlessly so that the one side thereof faces to the endless inner circumferential side and the other side thereof faces to the endless outer circumferential side.

5. A double-sided driving silent chain transmission, comprising:
the double-sided driving silent chain described in claim 1;
a first sprocket that engages with the one side of the double-sided driving silent chain; and
a second sprocket that engages with the other side of the double-sided driving silent chain:
wherein the first and second sprockets engage respectively the respective sprocket engagement mechanisms of the one side or the other side and a height of teeth of the second sprocket is shorter than that of the first sprocket.

6. The double-sided driving silent chain transmission according to claim 5, wherein the teeth of the first and second sprockets are cut by a hob cutter having the same shape while undercutting the teeth of the second sprocket.

7. The double-sided driving silent chain transmission according to claim 5, further comprising a slidable contact section that guides the double-sided driving silent chain by slidably contacting with the other side of the chain.

* * * * *